United States Patent
Brand

(10) Patent No.: US 11,827,333 B2
(45) Date of Patent: Nov. 28, 2023

(54) OBJECT IMPACT PROTECTION FOR AN AIRCRAFT

(71) Applicant: Bell Helicopter Textron Inc., Fort Worth, TX (US)

(72) Inventor: Albert Gerard Brand, N. Richland Hills, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 493 days.

(21) Appl. No.: 16/399,922

(22) Filed: Apr. 30, 2019

(65) Prior Publication Data

US 2020/0346732 A1    Nov. 5, 2020

(51) Int. Cl.
*B64C 1/14*    (2006.01)
*B64C 1/06*    (2006.01)
*B60J 1/20*    (2006.01)

(52) U.S. Cl.
CPC ........... *B64C 1/1492* (2013.01); *B60J 1/2094* (2013.01); *B64C 1/062* (2013.01); *B60Y 2200/50* (2013.01)

(58) Field of Classification Search
CPC ....... B64C 1/1476; B64C 1/12; B64C 1/1492; B64C 1/062
See application file for complete search history.

(56) References Cited

U.S. PATENT DOCUMENTS

| | | | | |
|---|---|---|---|---|
| 3,618,881 A * | 11/1971 | Fellers | ................ | B64C 1/1476 244/121 |
| 4,044,973 A * | 8/1977 | Moorehead | ............ | B64D 27/26 244/54 |
| H979 H * | 11/1991 | Kelley | ........................ | 244/121 |
| 6,695,296 B1 * | 2/2004 | Runge | ..................... | F16F 1/377 267/153 |
| 7,997,529 B2 * | 8/2011 | Koch | ...................... | B64C 1/062 244/121 |
| 9,108,714 B2 * | 8/2015 | Lieven | ..................... | B64C 1/12 |
| 2005/0248191 A1 * | 11/2005 | Azeau | ....................... | F16F 7/12 297/216.1 |
| 2016/0134848 A1 * | 5/2016 | Watanabe | .............. | H04N 9/317 345/7 |
| 2016/0332715 A1 * | 11/2016 | Zarkowskyj | .............. | B64C 1/12 |

* cited by examiner

*Primary Examiner* — Nicholas McFall
*Assistant Examiner* — Eric Acosta
(74) *Attorney, Agent, or Firm* — Pramudji Law Group PLLC; Ari Pramudji

(57) ABSTRACT

Various implementations described herein are directed to an aircraft. The aircraft includes an airframe; and a windshield system having a transparent canopy coupled to the airframe and a transparent inner panel having a portion thereof disposed within the transparent canopy and coupled to the airframe and to at least a processor.

20 Claims, 4 Drawing Sheets

OBJECT IMPACT PROTECTION FOR AN AIRCRAFT

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Aircraft are susceptible to object impacts that can break a windshield and allow an object to penetrate the cockpit of the aircraft, especially during high-speed flight. Current windshields are designed using a thick transparency material that adds significant additional weight to the aircraft. The weight problem is compounded in windshield designs with aerodynamic styling, which greatly increases the surface area of the windscreen. The pilot being injured and/or also losing situational awareness are the leading causes of object impact related accidents, fatalities, and loss of aircraft.

SUMMARY

Described herein are various implementations of an aircraft. In one implementation, the aircraft includes an airframe; and a windshield system having a transparent canopy coupled to the airframe and a transparent inner panel having a portion thereof disposed within the transparent canopy and coupled to the airframe.

In one implementation, the transparent canopy can be configured to handle aerodynamic loads. In one implementation, the transparent canopy may be constructed in a manner that allows a striking object to penetrate the transparent canopy.

In one implementation, the transparent inner panel can be configured to withstand object impacts.

In one implementation, the transparent inner panel can be placed at a cross-section along an inner portion of the transparent canopy. A forward portion of the inner portion of the transparent canopy may be unpressurized and an aft portion of the inner portion of the transparent canopy may be pressurized.

In one implementation, the transparent inner panel may have a smaller surface area than the transparent canopy.

In one implementation, placement of the transparent inner panel may be varied based on an ability to protect against a striking object.

In one implementation, a thickness of the transparent inner panel can be selected based on speed specifications of the aircraft and a mass and relative velocity of a striking object.

In one implementation, the transparent canopy can be formed from acrylic.

In one implementation, the transparent inner panel can be formed from polycarbonate or glass or laminates thereof.

In one implementation, the transparent inner panel is thicker than the transparent canopy.

In one implementation, the transparent canopy is aerodynamically contoured.

In one implementation, the transparent inner panel may be substantially flat.

In one implementation, a plurality of shock mounts can be coupled to the transparent inner panel.

In one implementation, a peak load of an object impact can be minimized using the plurality of shock mounts.

In one implementation, a bracing structure may be coupled between one of the plurality of shock mounts and the airframe. The bracing structure may include a stroking mechanism that provides flexibility and/or impact absorption for the bracing bar.

In one implementation, the transparent inner panel may include a heads-up display.

Also described herein is a dual transparent windshield for an aircraft. In one implementation, the dual transparent windshield includes a first windshield configured to handle non-impact loads; and a second windshield having a portion thereof placed within the first windshield and configured to withstand object impacts.

Also described herein is a windshield retrofitting kit for an aircraft. In one implementation, the windshield retrofitting kit includes a transparent canopy configured to be coupled to an airframe of the aircraft; and a transparent inner panel having a portion thereof configured to be disposed within the transparent canopy and coupled to the airframe.

In one implementation, the retrofitting kit may include a plurality of shock mounts configured to be coupled to the transparent canopy, the transparent inner panel and the airframe. The retrofitting kit may also include a bracing structure configured to be coupled between the transparent inner panel and the airframe.

The above referenced summary section is provided to introduce a selection of concepts in a simplified form that are further described below in the detailed description section. Additional concepts and various other implementations are also described in the detailed description. The summary is not intended to identify key features or essential features of the claimed subject matter, nor is it intended to be used to limit the scope of the claimed subject matter, nor is it intended to limit the number of inventions described herein. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Figure 1:
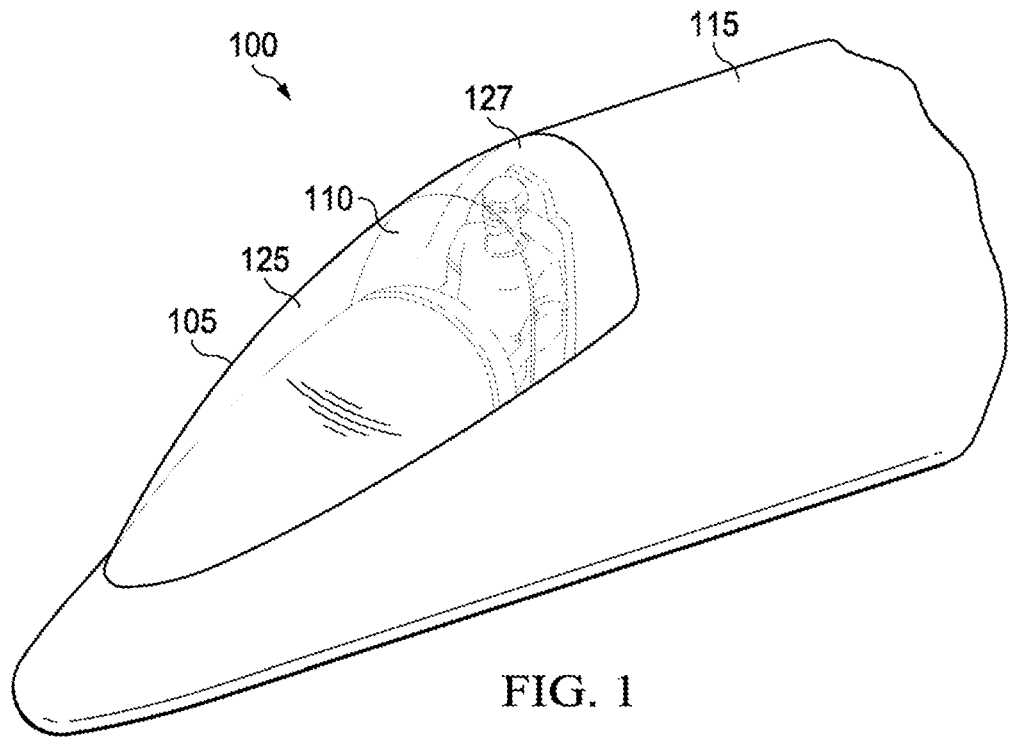
FIG. 1 illustrates a perspective view of a dual transparent windshield for an aircraft in accordance with implementations of various techniques described herein.
Figure 2:
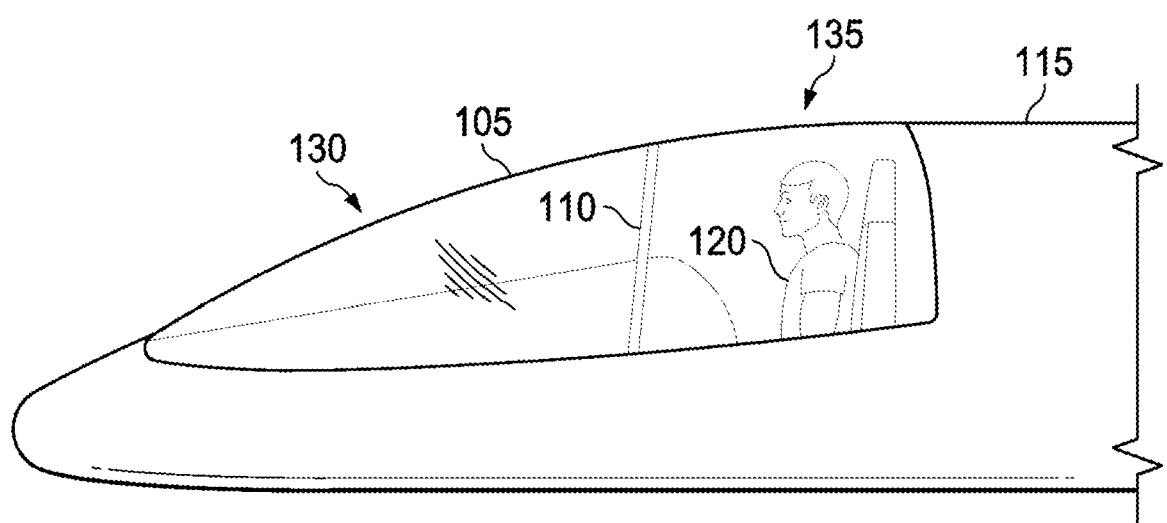
FIG. 2 illustrates a side view of the dual transparent windshield for the aircraft of FIG. 1 in accordance with implementations of various techniques described herein.

FIG. 1 and FIG. 2 illustrate a dual transparent windshield for an aircraft 100 according to one implementation. Aircraft 100 includes an airframe 115 and windshield system that includes a transparent canopy 105 and a transparent inner panel 110. Transparent canopy 105 is formed using a thin material and is configured to handle non-impact, e.g., aerodynamic, loads. Transparent inner panel 110 is formed from a thicker and stronger material and is configured to withstand object impacts. Transparent canopy 105 and transparent inner panel 110 are coupled to airframe 115. Transparent canopy 105 and transparent inner panel 110 may be coupled to the airframe 115 using bonding, mechanical fasteners, clamping or any other suitable fastening techniques. The transparent inner panel 110 is placed at a cross-section along an inner portion 125 of the transparent canopy 105 and acts as a windshield in front of the pilot 120. The inner portion 125 includes a cockpit 127, which is a space within the airframe 115, e.g., the forward fuselage, of an aircraft. Cockpit 127 may include flight controls, an instrument panel, at least one seat for the pilot 120 and optional additional seating for a co-pilot and/or flight crew. The transparent inner panel 110 acts as a shield against bird strikes, bullets and/or other objects. In the event that an object breaks through the transparent canopy 105, the object can be stopped by the transparent inner panel 110. The transparent inner panel 110 can be thicker and provide the ability to focus object protection on a much smaller aperture, e.g., a field of view of the pilot 120.

In one implementation, transparent inner panel 110 is substantially flat. Designing the transparent inner panel 110 to be substantially flat provides the ability to more easily produce a thick transparent inner panel with high-quality optical characteristics. Achieving high quality optical characteristics in an aerodynamically contoured transparent canopy 105 is especially difficult if the canopy is made thick to resist object impact. If impact resistance is transferred to inner transparency 110, then canopy 105 can be thin and it is possible to achieve high quality optical characteristics in the canopy 105, complementing the high-quality optical characteristics of the inner transparent panel 110. The transparent canopy 105 can be curved, e.g., aerodynamically contoured, configured to be of thin material with high optical quality and not designed to withstand object impact loads. The transparent inner panel 110 can be configured to be of minimal curvature with high optical quality and further configured to provide object strike protection.

Transparent inner panel 110 has a smaller surface area than transparent canopy 105. Placing transparent inner panel 110 within transparent canopy 105 provides the ability to focus object impact protection on a small area rather than the whole canopy, thus saving significant weight. The surface area of transparent inner panel 110 is a fraction of the surface area of canopy 130. Providing canopy-based object impact protection would require significantly thicker transparency material over much more area. Focusing object impact protection on transparent inner panel 110 instead of transparent canopy 105 reduces the need to have a thick and heavy canopy. The aerodynamic styling and low drag of a sleek canopy can be retained while providing object impact protection using a small, thick transparent inner panel. The transparent canopy 105 can be made from a thin material with high-quality optical characteristics that is much easier to produce than a thicker, heavier canopy. In addition to providing a weight disadvantage, a thick, heavy canopy is very expensive and much more complex to produce without optical distortions.

In one implementation, aerodynamic requirements of the aircraft 100 govern the design of the transparent canopy 105. In one implementation, placement of the transparent inner panel 110 can be varied based on an ability to protect the pilot 120 against a striking object.

The transparent inner panel 110 can be designed to be thinner or thicker based on the speed specifications of the aircraft and the type of impact protection desired, e.g., a mass and relative velocity of an impact, e.g., striking, object. The transparent canopy 105 can be designed to be thinner than the transparent inner panel 110 and configured to handle aerodynamic loads.

Transparent canopy 105 can be formed from acrylic, glass, or other suitable transparent material. Transparent inner panel 110 can be formed from polycarbonate, glass, laminated glass or laminated polycarbonate. Due to the placement of transparent inner panel 110 within transparent canopy 105, transparent inner panel 110 does not need to be abrasion resistant. Abrasion resistance is usually necessary to prevent an exterior-facing surface of a windshield from becoming cloudy over time. In one implementation, both the transparent canopy 105 and the transparent inner panel 110 can be formed from the same material. When the transparent canopy 105 and the transparent inner panel 110 are formed from the same material, the transparent inner panel 110 is formed to be thicker than the transparent canopy 105 in order to withstand an object impact.

In one implementation, neither a forward portion 130 or an aft portion 135 of inner portion 125 are pressurized. In one implementation, a two-part canopy is provided. In this implementation, the forward portion 130 of the inner portion 125 is unpressurized and the aft portion 135, i.e., the portion including cockpit 127, of inner portion 125 is pressurized. In the event of an object strike that causes a break in the transparent canopy 105 of an aircraft having a pressurized cockpit, the aft portion 135 of the inner portion 125 remains pressurized.

Figure 3:
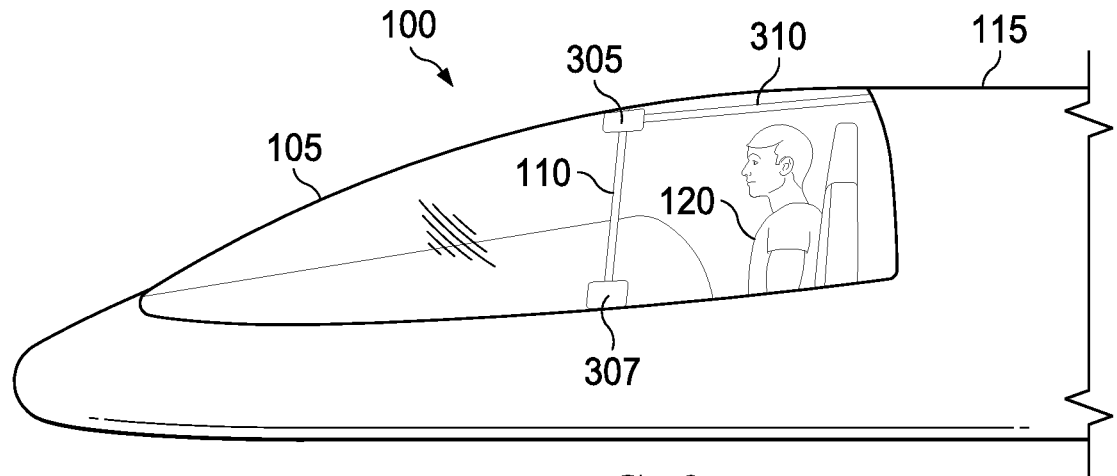
FIG. 3 illustrates a side view of the dual transparent windshield for the aircraft of FIG. 1 including shock mounts and a bracing bar in accordance with implementations of various techniques described herein.
Figure 4:
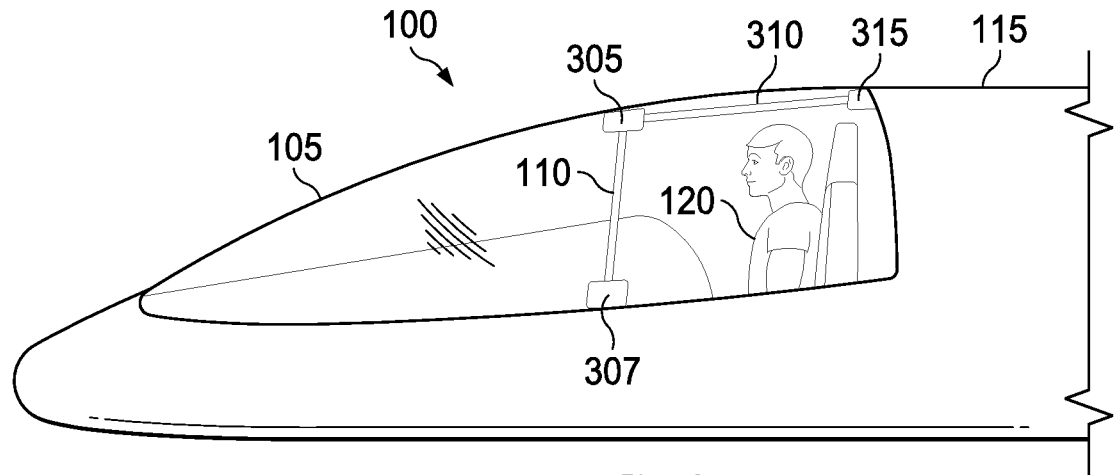
FIG. 4 illustrates a side view of the dual transparent windshield for the aircraft of FIG. 1 including shock mounts and a bracing bar in accordance with implementations of various techniques described herein.

FIG. 3 and FIG. 4 illustrate another implementation/embodiment of a dual transparent windshield for an aircraft 100 including shock mounts and a bracing structure. In this implementation, the shock mounts 305, 307 and the bracing structure, e.g., bracing bar 310, can be peripheral elastomeric shock mounts and a structural bracing bar, respectively. Shock mounts 305 couple the transparent inner panel 110 to the structural bracing bar 310. Bracing bar 310 and shock mounts 305, 307 couple the transparent inner panel 110 to the airframe 115. Shock mounts 305, 307 help absorb the impact when an object passes through transparent canopy 105 and hits transparent inner panel 110. The peak load of the object impact can be minimized using shock mounts 305, 307. Bracing bar 310 can be mounted above the pilot 120 between one of the shock mounts 305 and the airframe 115. In one implementation, bracing bar 310 includes a stroking mechanism that provides flexibility and/or impact absorption for the bracing bar 310. In one implementation, as shown in FIG. 4, additional shock mount(s) 315 can be coupled between bracing bar 310 and the airframe 115.

Shock mounts 305, 307 can be made of rubber or any other material having elastomeric properties or may be a mechanical system such as a stroking shock absorber. Bracing bar 310 can be composed of aluminum or any other lightweight material. Bracing bar 310 can alternatively be composed of titanium for implementations where a lightweight metal having steel-like strength is desired.

Figure 5:
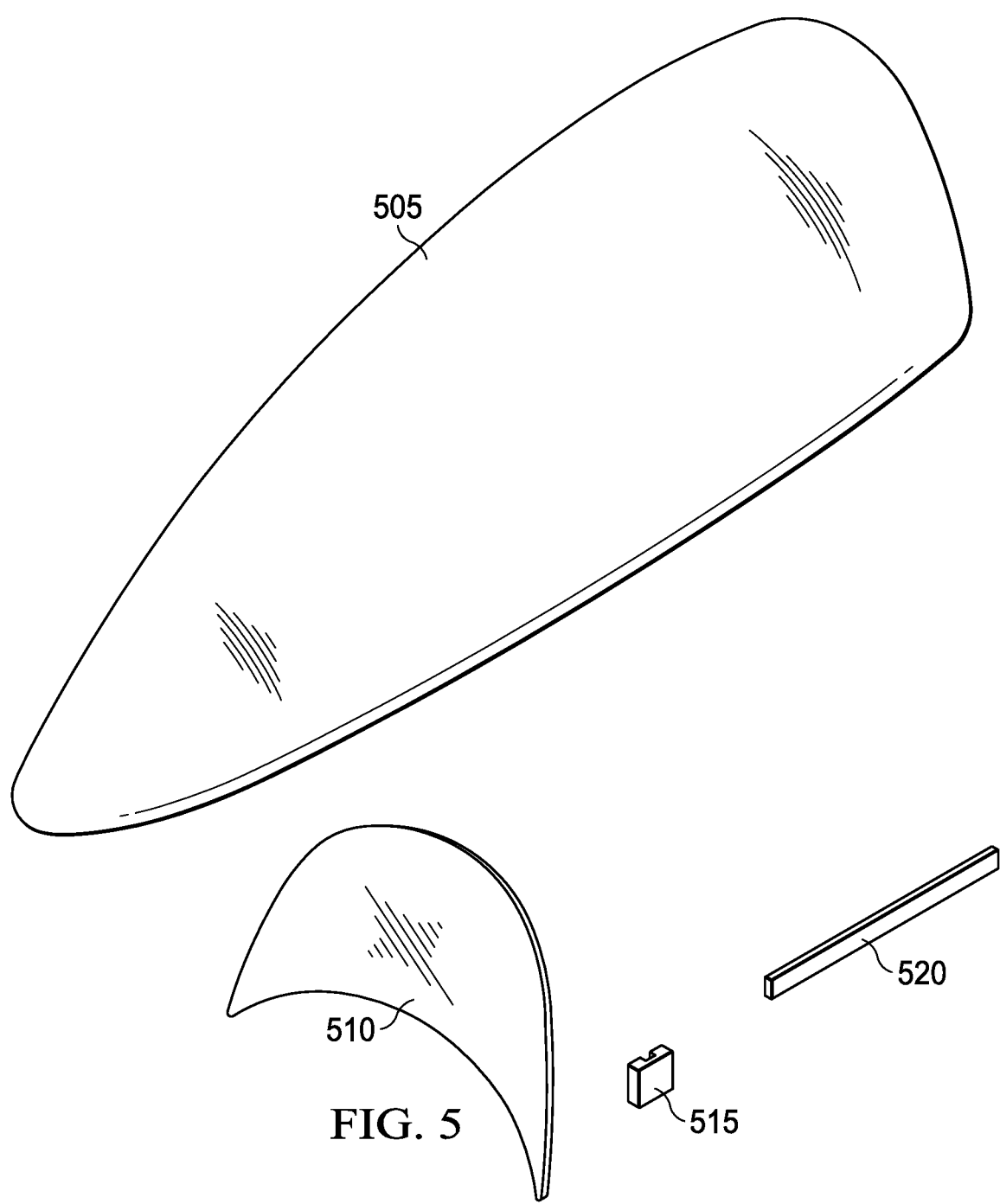
FIG. 5 illustrates parts for a retrofitting system for an aircraft in accordance with implementations of various techniques described herein.

FIG. 5 illustrates parts for a windshield retrofitting kit/system for an aircraft. In one implementation, a thick, heavy canopy designed to withstand object impacts can be retrofitted to include a new transparent canopy 505 and a transparent inner panel 510. Transparent canopy 505 can be constructed of lightweight acrylic and object impact protection can be provided by transparent inner panel 510. In some implementations, shock mount(s) 515 and/or bracing bar 520 may be included with the retrofitting system to provide impact absorption.

In one implementation an aircraft having a transparent canopy that does not currently meet object impact standards can be retrofitted to include only the transparent inner panel 510. Shock mount(s) 515 and/or bracing bar 520 may be included to provide impact absorption.

Previous retrofit systems usually replaced an acrylic canopy with a heavier and more expensive polycarbonate canopy to provide object impact protection. The retrofitting kit of FIG. 5 provides a lighter weight and less costly option than previous heavy polycarbonate canopies designed to withstand object impacts.

In one implementation, transparent inner panel 110, 510 can serve as a heads-up display. In some aircraft, the pilot needs to look within the cockpit for information, e.g., airspeed, instrument readings, etc. Some pilot helmets provide the ability to receive information on a visor of the helmet. Providing transparent inner panel 110, 510 as a heads-up display can eliminate the need for a visor on the pilot's helmet and/or obviate the need for the pilot to look within the cockpit for the information. This transparent inner panel can serve as a heads-up display by coupling to the hardware configuration of FIG. 6.

Figure 6:
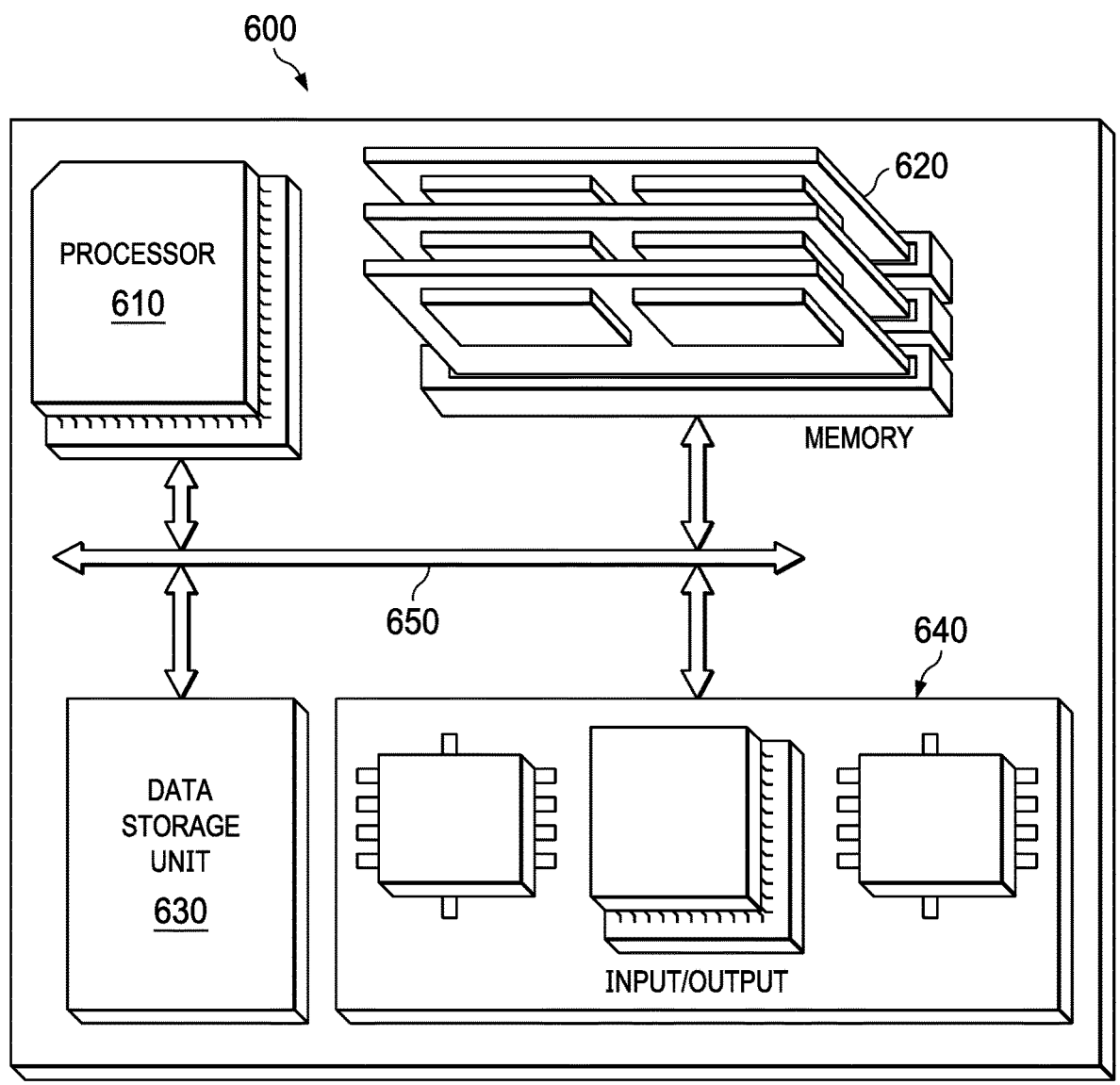
FIG. 6 illustrates a computing system in accordance with implementations of various techniques described herein.

FIG. 6 is a block diagram of a hardware configuration 600 operable to provide a heads-up display. The hardware configuration 600 can include a processor 610, a memory 620, a storage device 630, and an input/output device 640. Each of the components 610, 620, 630, and 640 can, for example, be interconnected using a system bus 650. The processor 610 can be capable of processing instructions for execution within the hardware configuration 600. In one implementation, the processor 610 can be a single-threaded processor. In another implementation, the processor 610 can be a multi-threaded processor. The processor 610 can be capable of processing instructions stored in the memory 620 or on the storage device 630.

The memory 620 can store information within the hardware configuration 600. In one implementation, the memory 620 can be a computer-readable medium. In one implementation, the memory 620 can be a volatile memory unit. In another implementation, the memory 620 can be a non-volatile memory unit.

In some implementations, the storage device 630 can be capable of providing mass storage for the hardware configuration 600. In one implementation, the storage device 630 can be a computer-readable medium. In various different implementations, the storage device 630 can, for example, include a hard disk device/drive, an optical disk device, flash memory or some other large capacity storage device. In other implementations, the storage device 630 can be a device external to the hardware configuration 600.

The input/output device 640 provides input/output operations for the hardware configuration 600. In one implementation, the input/output device 640 can include one or more heads-up display system interfaces, sensors and/or data transfer ports.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto-optical disks; and CD ROM and DVD ROM disks. The processor and the memory can be supplemented by, or incorporated in, special purpose logic circuitry.

The discussion above is directed to certain specific implementations. It is to be understood that the discussion above is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions may be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

In the above detailed description, numerous specific details were set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower", "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An aircraft, comprising:
   an airframe; and
   a windshield system having:
      a transparent canopy coupled to the airframe; and
      a transparent inner panel having a portion thereof disposed within the transparent canopy and coupled to the airframe via a plurality of shock mounts that are configured to minimize peak load of an object impact on the transparent inner panel;
   wherein at least one first shock mount of the plurality of shock mounts is at an upper portion of the transparent inner panel;
   wherein at least one second shock mount of the plurality of shock mounts is at a lower portion of the transparent inner panel, and
   a bracing structure connected to the at least one first shock mount.

2. The aircraft of claim 1, wherein the transparent canopy is configured to withstand aerodynamic loads.

3. The aircraft of claim 1, wherein the transparent inner panel is configured to withstand object impacts.

4. The aircraft of claim 1, wherein the transparent inner panel is placed at a cross-section along an inner portion of the transparent canopy.

5. The aircraft of claim 4, wherein a forward portion of the inner portion of the transparent canopy is unpressurized and an aft portion of the inner portion of the transparent canopy is pressurized.

6. The aircraft of claim 1, wherein the transparent inner panel has a smaller surface area than the transparent canopy.

7. The aircraft of claim 1, wherein placement of the transparent inner panel is varied based on an ability to protect against a striking object.

8. The aircraft of claim 1, wherein a thickness of the transparent inner panel is selected based on speed specifications of the aircraft and a mass and relative velocity of a striking object.

9. The aircraft of claim 1, wherein the transparent inner panel is thicker than the transparent canopy.

10. The aircraft of claim 1, wherein the transparent canopy is aerodynamically contoured.

11. The aircraft of claim 1, wherein the transparent inner panel is substantially planar.

12. The aircraft of claim 1, wherein a peak load of an object impact is minimized using the plurality of shock mounts.

13. The aircraft of claim 1, wherein the bracing structure is coupled between the at least one first shock mount and the airframe.

14. The aircraft of claim 13, wherein the bracing structure includes a stroking mechanism that provides flexibility and/or impact absorption for a bracing bar.

15. The aircraft of claim 1, wherein the plurality of shock mounts comprises elastomeric shock mounts.

16. A dual transparent windshield for an aircraft, comprising:
- a first windshield configured to be coupled to a frame of the aircraft and withstand non-impact loads; and
- a second windshield having a portion thereof coupled to the first windshield via a plurality of shock mounts that are configured to minimize peak load of an object impact on the second windshield and configured to withstand object impacts,
- wherein at least one first shock mount of the plurality of shock mounts is at a roof portion of the second windshield,
- wherein at least one second shock mount of the plurality of shock mounts is at a base portion of the second windshield, and
- wherein a first bracing structure is mounted to the at least one first shock mount.

17. The aircraft of claim 16, wherein the plurality of shock mounts comprises elastomeric shock mounts.

18. A windshield retrofitting kit for an aircraft, comprising:
- a transparent canopy configured to be coupled to an airframe of the aircraft; and
- a transparent inner panel having a portion thereof configured to be disposed within the transparent canopy and coupled to the airframe and coupled to the transparent canopy via a plurality of shock mounts that are configured to minimize peak load of an object impact on the transparent inner panel,
- wherein at least one first shock mount of the plurality of shock mounts is at a roof portion of the transparent inner panel,
- wherein at least one second shock mount of the plurality of shock mounts is at a base portion of the transparent inner panel, and
- wherein a bracing structure is mounted to the at least one first shock mount of the plurality of shock mounts.

19. The windshield retrofitting kit for the aircraft of claim 18, wherein the at least one first shock mount is coupled to the airframe.

20. The windshield retrofitting kit for the aircraft of claim 19, further comprising a second bracing structure configured to be coupled between the transparent inner panel and the airframe.

* * * * *